United States Patent
Bjurfjell

(12) 
(10) Patent No.: US 6,356,737 B1
(45) Date of Patent: Mar. 12, 2002

(54) TERRESTRIAL COMMUNICATION SYSTEM USING SATELLITE TRANSMISSION TECHNIQUES

(75) Inventor: Edvard Bjurfjell, Kristianstad (SE)

(73) Assignees: Claes Lorentz Uno Wellton Persson, Stockholm; Hans Erik Svensson, Taby, both of (SE)

(*) Notice: Subject to any disclaimer, the term of this patent is extended or adjusted under 35 U.S.C. 154(b) by 0 days.

(21) Appl. No.: 09/308,657

(22) PCT Filed: Dec. 1, 1997

(86) PCT No.: PCT/SE97/02012

§ 371 Date: Jun. 1, 1999

§ 102(e) Date: Jun. 1, 1999

(87) PCT Pub. No.: WO98/25411

PCT Pub. Date: Jun. 11, 1998

(30) Foreign Application Priority Data

Dec. 1, 1996 (SE) .............................................. 9620302

(51) Int. Cl.[7] .................................................. H04N 7/20
(52) U.S. Cl. ...................... 455/3.05; 455/3.02; 455/562; 725/73; 725/64
(58) Field of Search ................................ 455/561, 562, 455/13.1, 13.3, 3.01, 3.02, 3.05, 12.1; 725/73, 66, 65, 64, 63, 72; 343/702

(56) References Cited

FOREIGN PATENT DOCUMENTS

WO 95/31070 11/1995 ............ H04N/7/20

*Primary Examiner*—William Trost
*Assistant Examiner*—Rafael Perez-Gutierrez
(74) *Attorney, Agent, or Firm*—Jacobson Holman, PLLC

(57) ABSTRACT

A terrestrial communication system, facilitating audio, video, data, and any other type of communication within a local geographical area, and with an extremely large number of communication channels being made available simultaneously at a very low cost. It comprises at least two local terrestrial satellite (LTS), preferably located in a mast or any other supporting structure, each LTS having high frequency communication equipment substantially corresponding to a conventional geostationary satellite for digital transmission of video, audio, or data, arranged to transmit in the L Band (1–2 GHz), the S Band (2–4 GHz), or a high frequency band with a relatively low power output and having a preferably omnidirectional antenna installation for transmission in a substantially horizontal plane. The signals can be digitalized according to MPEG-2 or according to any known signal algorithm.

11 Claims, 4 Drawing Sheets

TERRESTRIAL COMMUNICATION SYSTEM USING SATELLITE TRANSMISSION TECHNIQUES

TECHNICAL FIELD

The present invention relates to a terrestrial communication system, facilitating audio, video, data, and any other type of communication within a local geographical area, and with an extremely large number of communication channels being made available simultaneously at a very low cost.

BACKGROUND ART

Audio, video, and data communication are rapidly increasing sectors of interest, and existing terrestrial communication circuits, radio communication channels and satellite communication systems are used extensively. Dedicated cable systems are also being used to cover local geographical areas with a large number of TV-channels, and these cable systems may also be used for data transmission purposes.

Digital transmission techniques have been developed, and as a result, digital consumer TV transmissions are now available from satellite transponders, and due to the digital techniques utilized, the number of programs transmitted by each transponder is no longer one program only, since several programs can be transmitted simultaneously by each transponder.

However, with regard to terrestrial transmissions techniques, a suitable system has not yet been developed, but it is hoped that such a dedicated system will be made available within the next few years. This will require development of suitable encoders and decoders, specifically developed for terrestrial digital transmission techniques and frequency bands today used for terrestrial TV transmission purposes. Considerable efforts and large sums of money have been invested in the development of suitable techniques, but so far, these efforts have not been successful.

DISCLOSURE OF THE INVENTION

The present invention is based on the discovery that present satellite transmission techniques also can be used for terrestrial transmission.

As a result, a user having equipment intended for reception of digital satellite signals can also use the very same equipment for reception of terrestrial transmissions. This is achieved by arranging communication equipment of the type used in satellites as Local Terrestrial Satellites (LTS) in a mast or other suitable foundation. Transmission from a LTS is based on one of the conventional standards for digital transmission as today used by conventional orbiting geostationary satellites, e.g., MPEG-2 or MPEG-1 or any other standard suitable for audio, video or data transmission purposes. A preferred standard today is frequency modulated MPEG-2 (also compatible with MPEG-1), but other known or future standards may also be used, and amplitude modulated (AM) transmission techniques can also be used as an alternative to frequency modulated (FM) transmission techniques. Each LTS is transmitting using relatively low output power and with an antenna arrangement preferably having none or little directional effect. As a result, a suitable number of LTS can be arranged to cover a local geographical area, giving the inhabitants access to individual communication channels for data, video (TV), and audio communication. The advantages of such a system will be more fully discussed later.

The terrestrial communication system according to the present invention comprises at least one local terrestrial satellite (LTS), preferably located in a mast or any other supporting structure, each LTS having high frequency communication equipment substantially corresponding to a conventional geostationary satellite for digital transmission of video, audio or data, arranged to transmit in the L Band (1–2 GHz), the S Band (2–4 GHz) or a higher frequency band with a relatively low power output and having a preferably omnidirectional antenna installation for transmission in a substantially horizontal plane.

BRIEF DESCRIPTION OF DRAWINGS

A number of non-restricting examples of embodiments according to the present invention will be more fully described with reference to the accompanying drawings, in which.

MODES FOR CARRYING OUT THE INVENTION

As previously mentioned, the present invention is based on the discovery that present communication techniques used for digital satellite communication purposes also may be used for terrestrial communication purposes. This fact has not been realized previously, and consequently, all research efforts have been directed to the development of alternative techniques, facilitating digital transmission within the conventional TV-channel system.

According to the present invention, communication equipment of the type presently used in modern earth orbiting communication satellites is arranged in a mast or any other suitable structure, thereby forming a local terrestrial satellite (LTS). The transponders are connected to an omnidirectional antenna system, and the parties using the system preferably utilize parabolic antennas which can be directed towards said omnidirectional antenna system.

Figure 1:
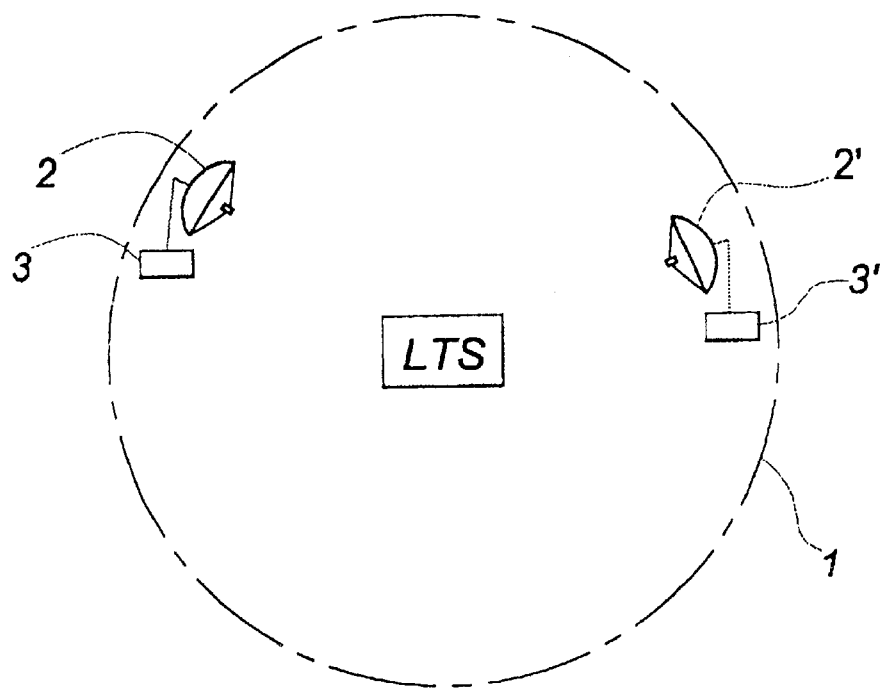
FIG. 1 is a view from above diagrammatically showing a basic system according to the invention, including only one local terrestrial satellite (LTS) and two users of the system.

A simple system of the above type is diagrammatically shown from above in FIG. 1, showing a LTS with a substantially circular and geographically restricted coverage, the border of which is denominated as 1, and a number of parabolic antennas 2, 2', each being connected to equipment 3, 3' of the type used for receiving and decoding digital signals of the same type as transmitted from conventional satellites. The output from this type of equipment 3, 3' is advantageously fed to a computer and a video signal may be viewed on a monitor, TV-screen or any other means, with the audio signal converted into audio from a loudspeaker system. With regard to data communication, same may be multi-directional, i.e., a computer with relevant equipment for reception/transmission of signals may receive and transmit signals from a computer to the LTS, and thus communicate either with other computers connected to the LTS or with other communication systems communicating with the LTS.

The above discussed system is a basic system, i.e., only one LTS is disclosed. However, the number of LTS within a local geographical area may be increased as desired, thereby increasing the number of communication channels substantially indefinitely.

This can be accomplished by arranging more than one LTS in a mast or other supporting structure, separated by a suitable vertical distance. This is shown diagrammatically in FIG. 2. Furthermore, such masts or supporting structures may also be arranged horizontally spaced from each other (as diagrammatically illustrated in FIG. 3), and provided that a user has a suitable directional antenna installation, e.g., a parabolic antenna or a multi-beam directional antenna, the antennas connected to the transponders of utilized LTS only require to be spaced apart a few degrees in relation to the location of a user to reduce interference from adjacently located LTS to an acceptable level (with interference from an adjacent non-selected LTS substantially reduced to nil).

Communication between transponders of utilized LTS and the users involves low output power transmission, typically an output power of 2–5 Watt is sufficient, even though increased output power also can be used. High frequency band transmission is also used, preferably starting at the S Band range 2–4 GHz but ranging up to 400 GHz. However, transmission can also take place outside these limits, e.g., within the L Band (1–2 GHz).

Low output power in combination with high frequency transmission makes it possible to restrict transmission to a predetermined restricted local geographical area. By increasing/reducing transmitted output power, the area covered by a LTS can be modified as desired. Modifications to the antenna system can also be used, in particular if interference should occur between two or more LTS having different locations, whereby output in non-desired direction (s) can be reduced as an alternative to reduction in output power.

Problems with interference between geostationary earth orbiting satellites and a LTS in the system according to the invention do not occur, since the LTS are located below the arc at the horizon defined by these satellites. Accordingly, transmitted signals from these geostationary satellites can be received without interference from LTS-transmitted signals on the very same frequency, since the receiving parabolic antenna has an increased angle to the horizontal plane when arranged to receive signal from an earth orbiting satellite as compared to an antenna intended for reception of signals from a LTS.

Figure 2:
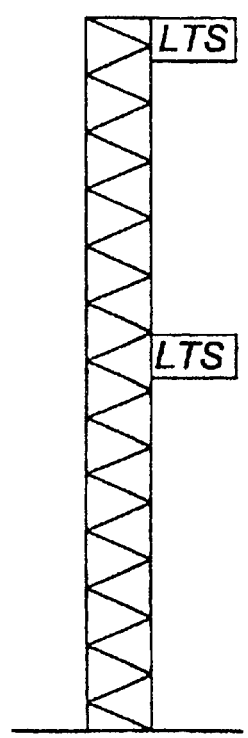
FIG. 2 is a diagrammatically shown side view of a mast arranged to support two LTS at different heights.
Figure 3:
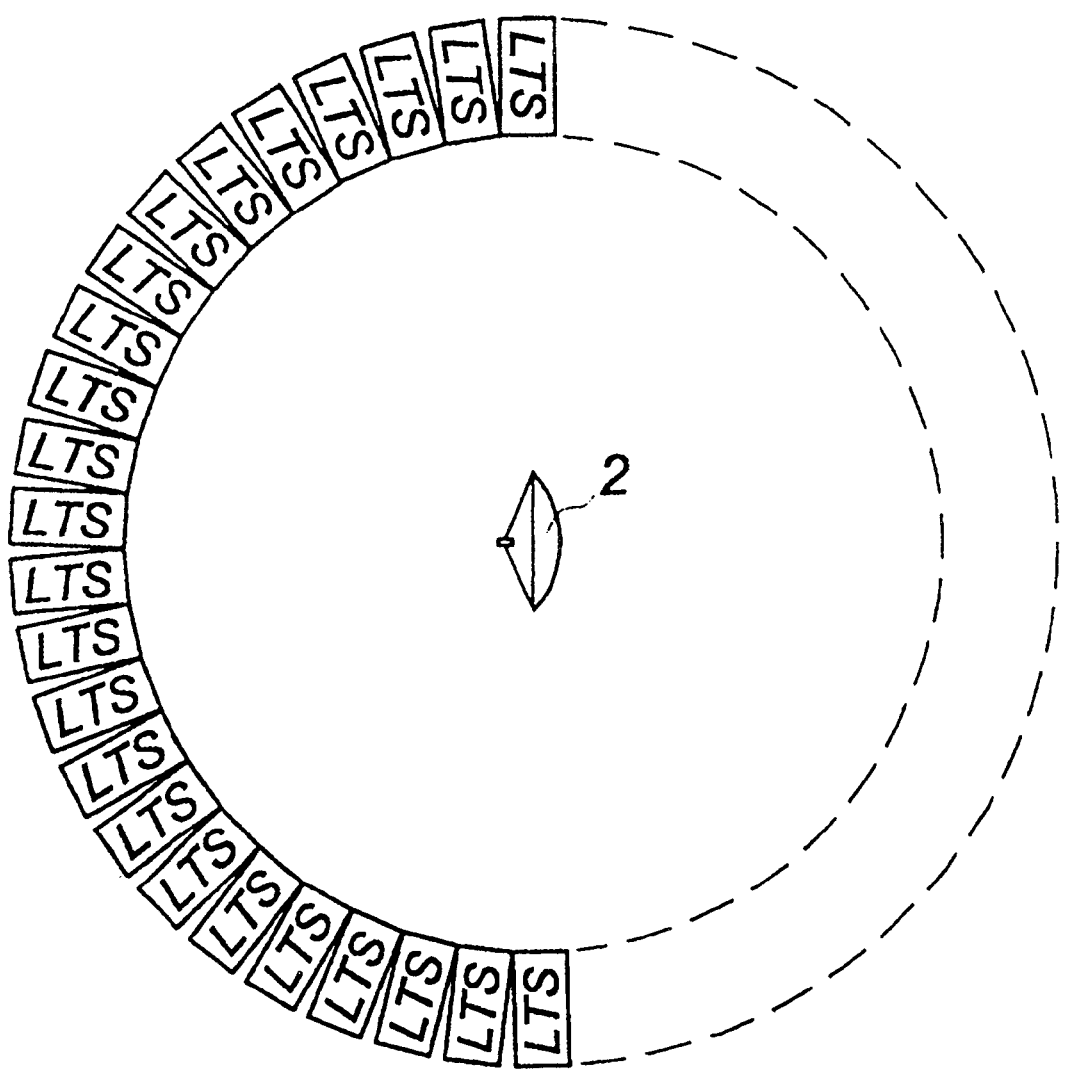
FIG. 3 is a side view diagrammatically showing a system according to the present invention, which theoretically illustrates how a large number of LTS can be disposed in a circular arrangement.
Figure 4:
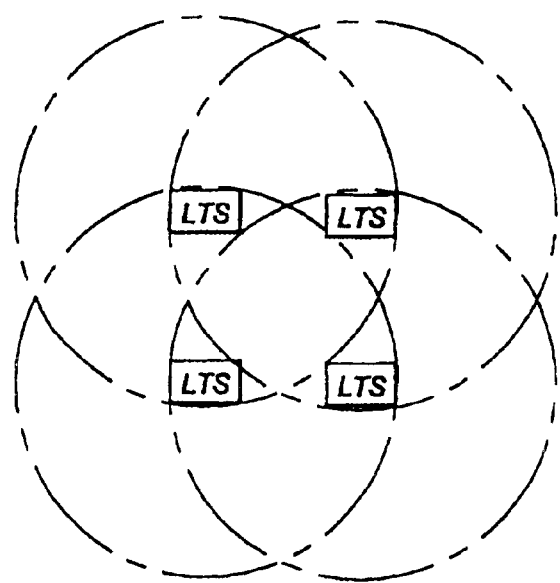
FIG. 4 is a view from above of four LTS in a square arrangement, indicating the zone where users may communicate with any one of these four LTS.
Figure 5:
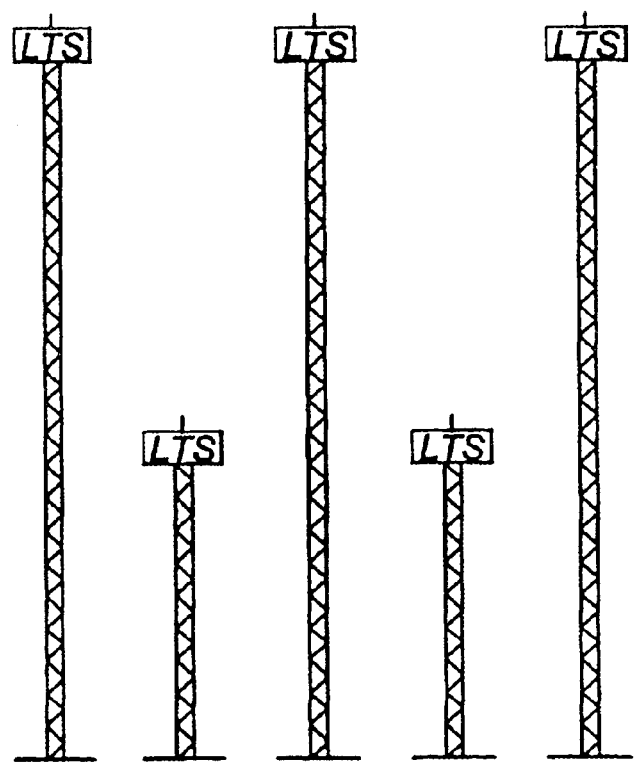
FIG. 5 is a side view of a number of masts, each one supporting a LTS, intended to illustrate how the masts or any other supporting structure can be more closely located to each other.

The system according to the present invention makes it possible within a local geographical area to obtain a considerable number of communication channels. It is known that the difference in the location of geostationary satellites only need to be in the region of 2°–3° in order to avoid interference between channels transmitted with the same frequency. Even if this angular difference is increased to 6° for a system according to the present invention, this would result in 60 (360°/6) LTS-locations when arranged located circular as shown in FIG. 3. Should each mast or any other structure supporting the local terrestrial satellites be arranged to support three individual LTS (located high, very high, and extremely high), the number of LTS covering a predetermined restricted geographical area would be increased to 180 (3×60), whereas an arrangement with two LTS increases the number to 120 (FIG. 2). Each single LTS can transmit approximately 5,000 TV-programs of acceptable quality, and as a result, the system according to the present invention may simultaneously transmit 900,000 (180×5,000) different TV-programs within a local district, without interference problems. This number may actually be further increased, since the LTS may also be arranged alternating high-low in relation to the ground plane (as disclosed in FIG. 5), whereby each point of location may be even closer than the one shown in FIG. 3. The circular configuration of FIG. 3 can be replaced by any other configuration, and a further example is shown in FIG. 4.

With regard to equipment for reception of signals from a LTS, presently used parabolic dishes and satellite receivers with digital decoders can be used, provided that the frequencies of channels transmitted from the LTS fall within the same frequency range as used by present geostationary satellites. Accordingly, no additional expensive equipment will be required by the users for reception of TV or text TV, the only modification required would be to direct the parabolic dish antenna towards the LTS.

With regard to TV programs transmitted via the system according to the present invention, it is obviously possible to arrange a LTS used for TV transmission purposes connected to parabolic dishes and receiving equipment for programs transmitted from orbiting geostationary satellites, and retransmit these programs via the LTS. As a result, a user would gain access to all these channels without the normally required large diameter dish antenna and the control system facilitating rotation of the in order to locate and receive signals from various geostationary satellites having in relation to each other different positions. Pay channel programs can be requested by users of the system, and charged for the time viewed.

Another interesting feature with the system according to the present invention is the possibility of real "video on demand". The use of digital transmission techniques and "smart cards" has today made it possible to offer users of existing geostationary satellite systems the possibility to view certain programs on demand, e.g., movie films. However, the present systems involve transmission of films at certain predetermined hours, and a user can call the operator by telephone, requesting one of the films running at such a starting time. A specific signal is sent to the user, whereby the decoder (or a smart card) is activated to decode the requested film as from the starting time until the end of same. The cost for viewing this particular film is billed to the user. However, this can not be regarded as real video on demand, since the user is restricted to make a choice between a restricted number of films and the user must also accept predetermined starting hours.

Due to the large number of channels available in a system according to the present invention, video on demand can be offered which really meets any requirement by a user. Any desired film can be ordered, e.g., by telephone, as well as any starting time. When ordering, the user receives information of the channel number to be used, e.g., 28F. The operator has access to a video film library, e.g., by satellite communication, and may from any other part of the world obtain the desired film, transferred in digitalized form at a high speed and stored by the operator on a suitable storage medium, e.g., a hard disc storage device. This means that any film available in the world can be viewed at any desired time by an individual user, and the costs involves can be realized to a specific user.

As previously mentioned, the system according to the present invention can also be used for data communication purposes. A computer can thus, suitably equipped with transmitting and/or receiving equipment connected to an antenna system be arranged to communicate with a LTS. For example, communication via Internet can be established facilitating high speed communication, and with speeds unavailable via telephone circuits. The link from the LTS can be obtained via an earth orbiting geostationary satellite, cable, a LTS link system (to be discussed later), or any other suitable method. Such a computer may also be used as a TV receiver, or be linked to a separate monitor used as a TV screen.

Figure 6:
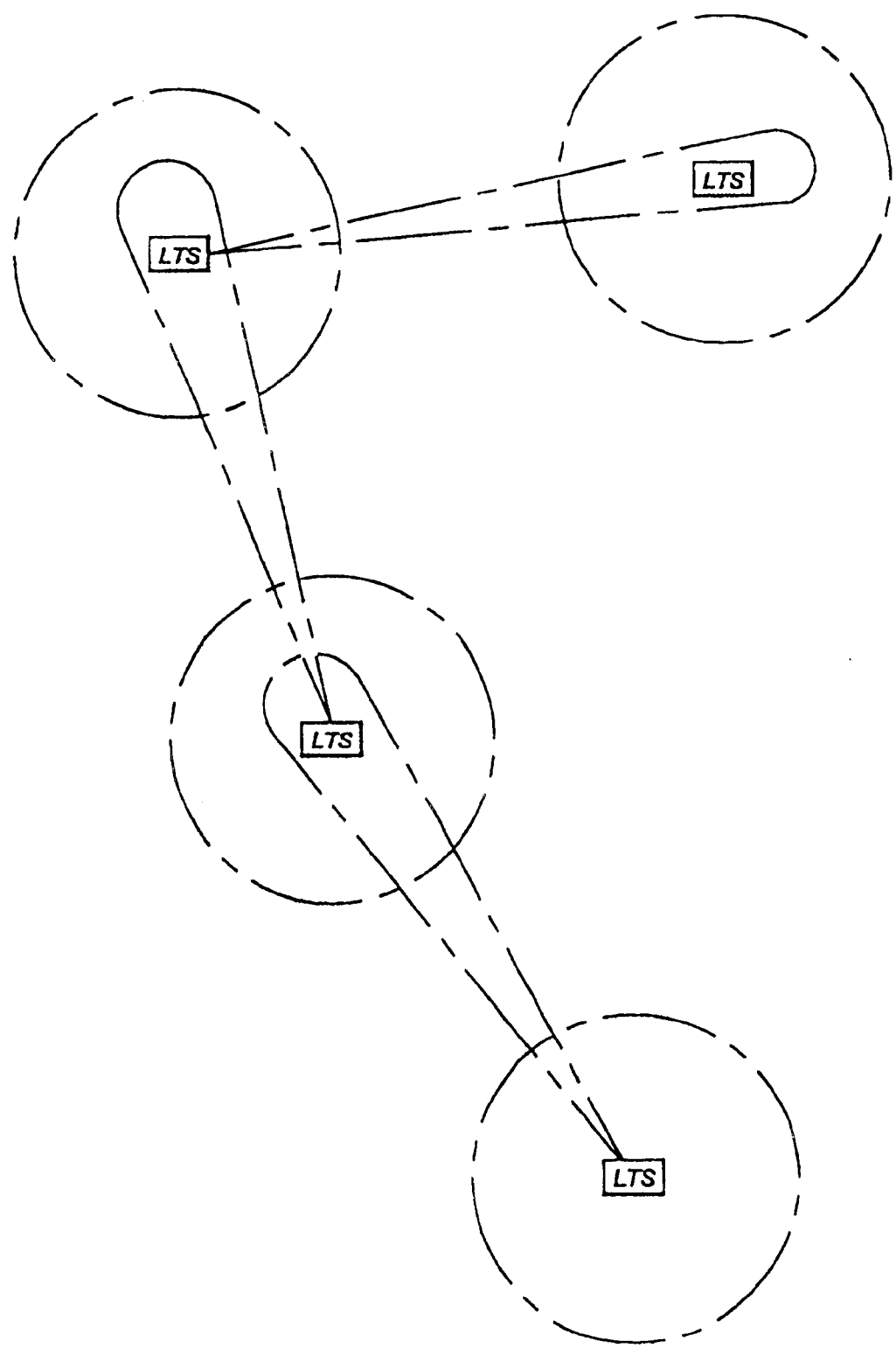
FIG. 6 is a diagrammatically view from above, disclosing how a number of LTS may be linked together for internal communication.

As mentioned above, the system according to the present invention may also be used with one or more of included LTS being part of a terrestrial link system. By including a preferably directional type of antenna in the antenna system, directed towards a second LTS, preferably also having a similar type of antenna directed towards the first LTS, a link can be established between the same. Said second LTS may be arranged in a manner similar to the first LTS in order to communicate with a third LTS, which in turn is equipped to communicate with a fourth LTS, and so on (FIG. 6). Local districts may thus be interconnected to each other and/or links can be established for long distance data, video or audio communication and/or communication with suitable centres giving access to communication cable networks or satellite communication or any other desired function.

It is also within the scope of the present invention to use the LTS for pure audio communication, i.e., a user may contact a LTS by means of a small transceiver in order to establish verbal contact with another user having similar communication equipment. Furthermore, the LTS can also be connected to a public telephone network, whereby a user with equipment substantially similar to a cellular telephone can initiate or receive telephone calls.

The type of LTS used in the system for terrestrial communication according to the present invention has not been described in detail, but comprises of the communication equipment as known to a person skilled in the art as suitable for a communication satellite in earth orbit, normally referred to as a geostationary satellite. The antenna system is normally of omnidirectional type, but may, as mentioned earlier, also include antennas for certain purposes having a more or less directed lobe. The equipment for reception of signals from a LTS includes preferably equipment similar to what is used for reception of signals from geostationary satellites using digital transmission techniques. An advantage of the present system is that the directional dish antenna required can be made very small as compared to dishes used for reception of signals from geostationary satellites. A preferred signalling technique is MPEG-2, but as stated earlier, any other known or future digital transmission technique can be used, including the earlier version of MPEG (MPEG-1). Frequency modulation (FM) is a preferred modulation technique, but amplitude modulation (AM) can also be used.

The above given examples of use for the system according to the present invention are only intended to disclose some of the applications possible with the system according to the present invention. However, fields of use are in no way restricted to these examples, since the present invention opens up new and previously unknown possibilities due to the extremely large number of communication channels made available in any certain area and without problems with interference from other channels or transmitters (due to the short range of the signals and the directivity of the antennas used for reception purposes). The LTS included in the system can advantageously make use of existing masts and other high structures, and the low cost of an LTS makes it possible to implement the system according to the present invention at very low costs. Reception of TV programs only requires today existing and widely available equipment as used for reception of signals from geostationary satellites.

The possibility of two-way communication from a computer to a LTS opens up the field of communication for companies, local authorities and other parties, and an individual may communicate with local shops and other local businesses, i.e., to place orders and make purchases.

All this is accomplished using low cost equipment and well tested techniques, resulting in an enormous availability of communication channels/frequencies within a restricted and local geographical area.

INDUSTRIAL APPLICABILITY

The system according to the present invention solves the problem of terrestrial transmission of digital video, audio, and data signals. Existing satellite receiving TV-sets may without additional equipment or modifications receive signal thousands of TV-channels from one of the LTS included in the system. Cable TV systems thus become obsolete, due to the low number of programs which can be transferred via cable, and also due to the initial costs for establishing a cable network. All problems with "shadows" (echoes) existing in conventional terrestrial TV systems are also avoided.

Furthermore, the system may be used for data communication purposes, whereby the communication speed is increased to speeds equivalent of a local area network (LAN). For example, in a municipality, the data system of the local administration can be accessed from schools, rescue service, and other local services without the need for a local high speed cable system. Local TV can be made available for all inhabitants at an extremely low cost.

Local systems according to the present invention may also serve as repeaters for TV programs transmitted from geostationary satellites or terrestrially transmitted TV programs, and local systems may also be linked together in a network.

The availability of such a large number of channels/frequencies at such a low cost opens up previously unknown possibilities to use information technology (IT) for novel and valuable purposes, e.g., education, local shopping, video on demand, working (distance working from home), high speed Internet communication, and may other fields of use.

What is claimed is:

1. A terrestrial communication system facilitating one way and/or two-way audio, video or data communication for users within a restricted geographical area with use of frequencies within the microwave range and a relatively low power output, characterized in, that the system comprises at least two local terrestrial satellites (LTS) having high frequency communication equipment substantially corresponding to a conventional geostationary satellite utilized digital transmission techniques, the antenna system of each LTS being located spaced from remaining LTS serving the geographical area to be covered, said antenna system being preferably omnidirectional and arranged for transmission in a substantially horizontal plane, users of the system having directional antenna installation being able to select desired LTS by a change of the directional antenna in an horizontal, rotary plane or vertical plane of inclination thus facilitating that frequencies used by one LTS of the system also are being used by any other LTS included in the system for similar or different communication purposes, thereby increasing the number of communication channels available within a given frequency segment to a substantially unlimited number of channels by inclusion of further LTS covering an intended geographical area.

2. A terrestrial communication system according to claim 1, characterized in, that the antenna system of at least two adjacently located local terrestrial satellites (LTS) are supported spaced from each other at different heights in a mast or any other structure supporting the same, sufficiently spaced from each other to facilitate transmission and/or reception of signals at any channel frequency with regard to users having directional antenna systems with a certain degree of inclination, without undue interference from other signals transmitted and/or received at the same frequency from antenna systems located at different height, thus facilitating simultaneous multiple use of any one frequency utilized by the system.

3. A terrestrial communication system according to claim 1, characterized in, that the geographical location in horizontal plane of adjacently located local terrestrial satellites (LTS) covering substantially or partly the same geographical area are located spaced from each other sufficiently to facilitate transmission and/or reception of signals at any given frequency with regard to users having directional antenna systems without undue interference from signals transmitted and/or received at the same frequency from local terrestrial satellites (LTS) having a different geographical location, thus facilitating simultaneous multiple use of any one frequency utilized by the system.

4. A terrestrial communication system according to claim 1, characterized in, that the number of communication channels within a specific geographical area and with a given number of communication frequencies is increased by an increased of the number of local terrestrial satellites (LTS) covering said specific geographical area each local terrestrial satellite (LTS) reusing said given number of communication frequencies which is the number of available communication channels equalling the given number of frequencies multiplied by the number of local terrestrial satellites (LTS).

5. A terrestrial communication system according to claim 1, characterized in, that the local terrestrial satellites (LTS) are arranged to be connected to a system for video film distribution, and that any video film available within such a system can be requested for individual viewing at any desired time by a user of the system.

6. A terrestrial communication system according to claim 1, characterized in, that the local terrestrial satellites (LTS) are arranged to be connected to a system for communication with geostationary satellites, and arranged to serve as repeaters for signals received from or transmitted to said geostationary satellites.

7. A terrestrial communication system according to claim 1, characterized in, that at least one local terrestrial satellite (LTS) is arranged having cable connection to a data communication network, a public or private telephone network or cable network.

8. A terrestrial communication system according to claim 1, characterized in, that signals transmitted from and/or received by the local terrestrial satellites (LTS) are digitalized according to MPEG-2, or according to a signal algorithm.

9. A terrestrial communication system according to claim 7, characterized in, that the geographical area covered by each local terrestrial satellite (LTS) is increased or reduced as required by adjustment of the output power.

10. A terrestrial communication system according to claim 1 characterized in, that at least two local terrestrial satellites (LTS) are arranged to be communicating with each other, preferably having directional antenna systems for this purpose.

11. A terrestrial communication system according to claim 1, characterized in, that the system is preferably arranged to operate within the L band or the S band, or at frequencies below 25 GHz.

\* \* \* \* \*